April 4, 1967 G. E. HEALD 3,312,119
REMOTE GEAR SHIFT LINKAGE MECHANISM
Filed March 22, 1965 3 Sheets-Sheet 2
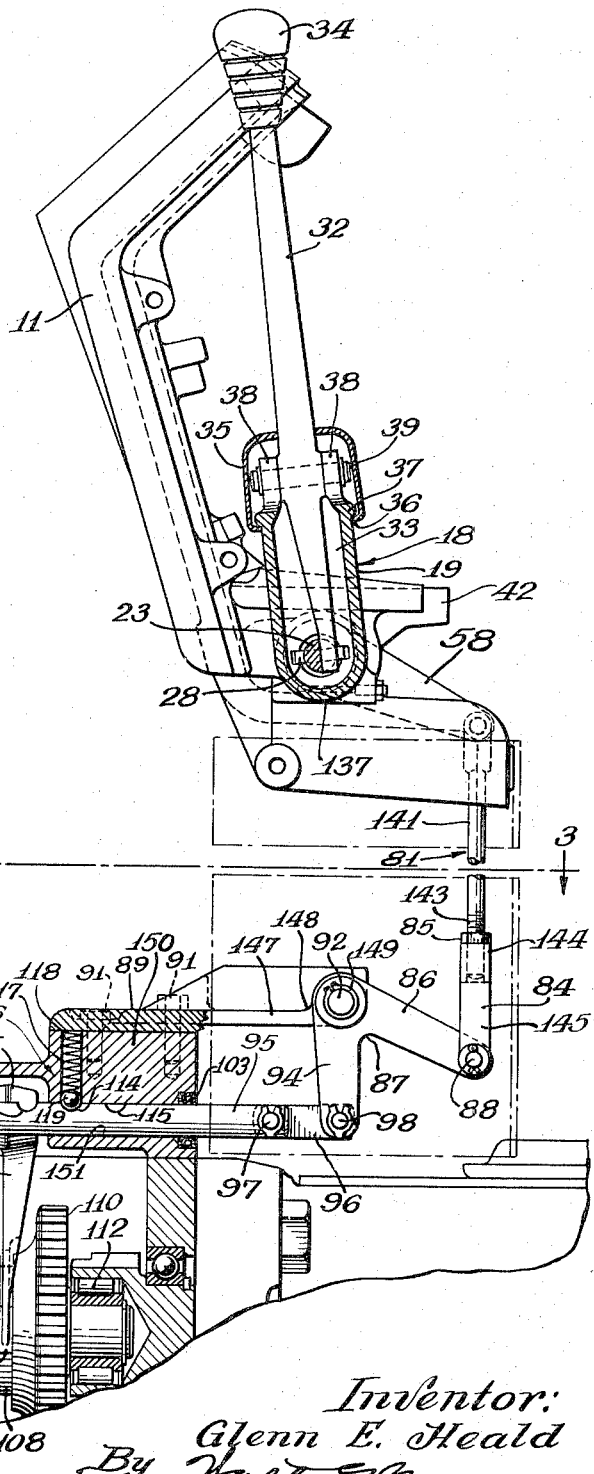
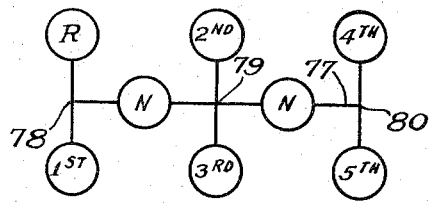
Inventor:
Glenn E. Heald
By Walter L. Greeny
Atty.

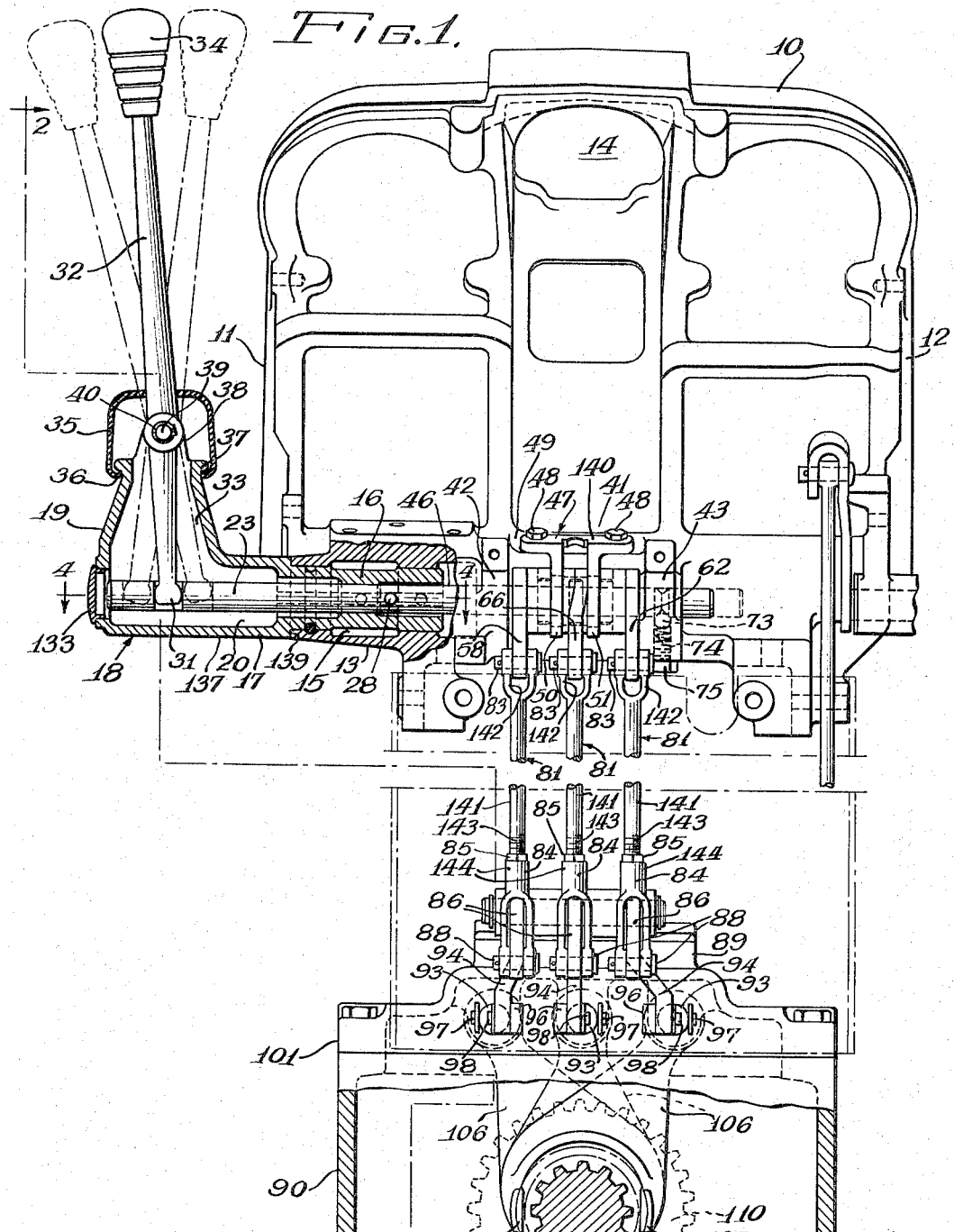

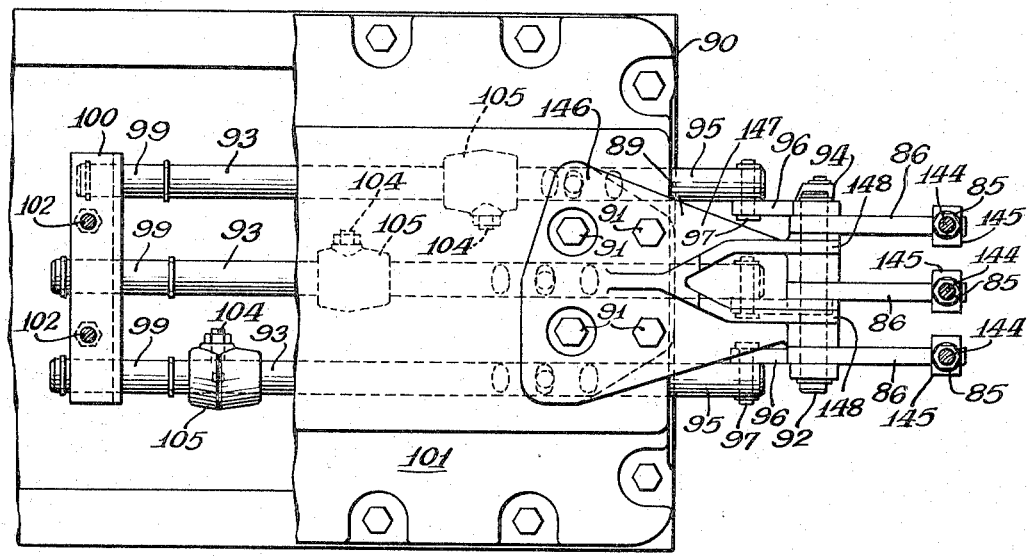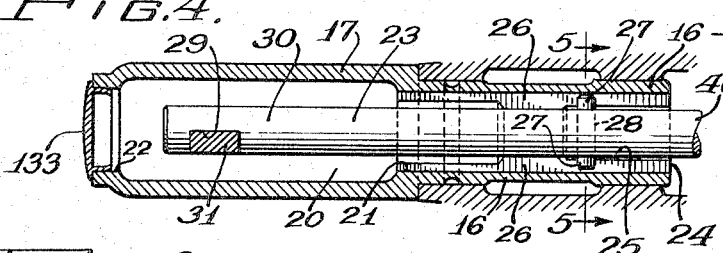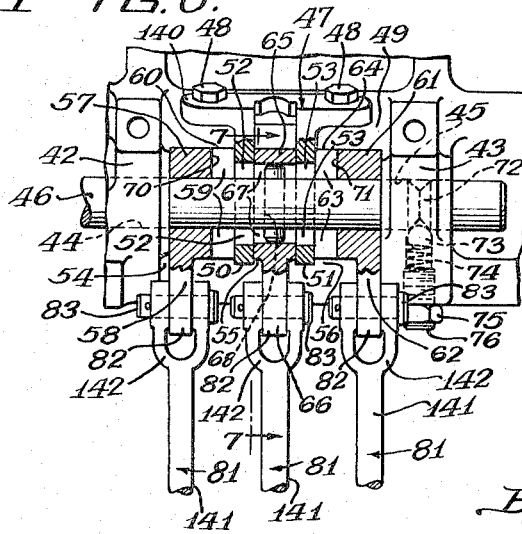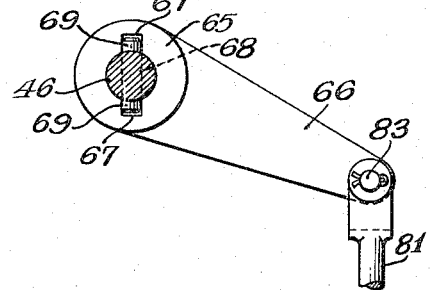

United States Patent Office 3,312,119
Patented Apr. 4, 1967

3,312,119
REMOTE GEAR SHIFT LINKAGE MECHANISM
Glenn E. Heald, Lisle, Ill., assignor to International Harvester Company, Chicago, Ill., a corporation of Delaware
Filed Mar. 22, 1965, Ser. No. 441,636
10 Claims. (Cl. 74—473)

The instant invention relates to gear shifting mechanisms. Particularly the invention relates to linkage means by which the gear mechanism of a change speed transmission and the like can be controlled from a remote position by means of a single shift lever.

In using various classes of power driven vehicles, such as, for example, farm tractors, there is a requirement for a vehicle operator frequently to mount and dismount from an operator's platform. To the end that such movement is facilitated, it is desirable that devices disposed along the platform be cleared for the operator's feet. In a conventional farm tractor, the transmission shift lever extends or is projected upwardly from the platform employed to support the tractor operator, and accordingly reduces platform area available for the operator's feet.

It is an object of the instant invention to provide a transmission gear changing mechanism having a manually controllable shift lever which is removed from the platform which is to be occupied by the feet of an operator of the vehicle of which the transmission to be shifted is a part.

It is additionally an object of the instant invention to dispose the manually controllable shift lever in a position convenient for operator manipulation.

It is a further object of the instant invention to position the manually operable shift lever laterally of a vehicle platform adapted to support an operator's feet and adjacent the instrument panel of a vehicle in which the transmission to be shifted by the shift lever is employed.

Another object of the instant invention is the provision of a novel remote gear shift linkage mechanism operated by a single lever for shifting each of a plurality of rail controlled gears to a plurality of selected positions.

Still an additional object of the invention is the provision of a remote gear shift mechanism including a single shift lever control for shifting each of a plurality of change speed transmission gears to a plurality of positions from a remote location and characterized by an elongated shift lever controlled selector shaft slidable longitudinally of its longitudinal axis to operably engage selected ones of various linkages of gears to be shifted, said selector shaft rotatable normally to its longitudinal axis for shifting each selected gear linkage and its corresponding gear.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is an elevational view of one embodiment of the remote gear shift linkage mechanism taken on a plane transversely of the body of the vehicle in which the same is employed and looking toward the rear, parts being broken away for the purpose of illustration.

FIG. 2 is a view partially in section and partially in elevation and taken substantially on the line 2—2 of FIG. 1 and looking in the direction of the arrows.

FIG. 3 is a view partially in section and partially a plan, taken substantially on the line 3—3 of FIG. 2 and looking in the direction of the arrows, parts being shown in dotted line for the purpose of illustration.

FIG. 4 is an enlarged horizontal sectional view taken substantially on the line 4—4 of FIG. 1 and looking in the direction of the arrows, and illustrating the means by which movement of the slidable selector shaft is controlled.

FIG. 5 is a vertical sectional view taken substantially on the line 5—5 of FIG. 4 and looking in the direction of the arrows.

FIG. 6 is an enlarged view of a fragment of the elevation shown in FIG. 1, parts being shown in section for the purpose of illustrating the means for selectively engaging the linkages operating the shiftable gears of the transmission.

FIG. 7 is a vertical sectional view taken substantially on the line 7—7 of FIG. 6 and looking in the direction of the arrows.

FIG. 8 is a diagram of the shift pattern of the embodiment viewed from above.

Now having reference more particularly to the drawings, in FIGS. 1 and 2 there is seen a conventional vehicular frame member 10 which may provide a steering column support having a medially disposed opening 14 in the upper portion thereof through which a steering column (not shown) is adapted to be projected upwardly, and by means of which a vehicle (not shown) adapted for employment of said frame 10 will be steered. The frame 10 may provide the means for supporting a customary instrument panel housing (not shown) transversely of such vehicle, and said frame is defined by a pair of sides 11 and 12 which may be substantially coincident with the opposite sides of such vehicle. The lower end portion 13 of the frame 10 is adapted for disposition in the vehicle with which said frame is adapted to be used above the level of the operator's platform or stand, and in such lower end portion 13 there is provided a transversely extending chamber 15 opening inwardly from side 11.

The inner end portion 16 of a transversely extending housing extension 17 of a gear shift lever housing generally designated as 18 is rockably mounted in said chamber 15 for movement clockwise and counterclockwise with respect to FIG. 2. The gear shift lever housing 18 has an upwardly extending housing extension 19 extending substantially normally upwardly from the outer end portion 137 of the transversely extending extension 17 and disposed adjacent though spaced slightly outwardly from the side 11. Inward movement of said housing 18 is precluded by engagement of an annular housing shoulder 139, from which inner end portion 16 projects inwardly, and the side 11, as illustrated in FIG. 1.

The transversely extending housing extension 17 has therein a chamber, conduit or passage 20 which extends longitudinally of said extension 17 and transversely of said frame 10 and which has an inner end opening 21 and an outer axially aligned end opening 22, as clearly illustrated in FIG. 4. The outer end opening 22 is closed by a conventional cap plate 133 and is a port through which an elongated shiftable selecter shaft 23, which will presently be described in detail, may be inserted upon original assembly of the device. As illustrated in FIG. 4, an elongated axially extending annular track member, guide or sleeve 24 is rigidly secured to or integral with the inner surface of the inner end portion 16 of housing extension 17. Said track member 24 restricts chamber 20 to a passage 25 which extends longitudinally of said track member 24 and through which a portion of the shaft 23 extends. As illustrated in FIGS. 4 and 5, the track member 24 comprises a cylinder-like structure having a pair of opposed axially extending slots or grooves 26 extending diametrically from passage 25 and in which there are slidably mounted, respectively, the opposite end portions 27 of a key 28 which may be press-fit or otherwise suitably secured diametrically of the shaft 23, as illustrated in FIGS. 1, 2, 4 and 5.

By reason of the foregoing construction, the selector shaft 23 is slidable transversely of frame 10 and axially of the transverse housing extension 17. However, said shaft 23 is locked from rotation independently of said housing extension 17 which will rotate about the longitudinal axis of said shaft 23 when said shaft is rotated. That is to say, when shaft 23 is rotated or rocked clockwise or counterclockwise with respect to FIG. 2, the gear shift lever housing 18 will also be rotated or rocked correspondingly.

The selector shaft 23 is adapted to be slidably displaced by reason of a shift lever receiving slot 29 in the outer end portion 30 of said shaft 23 in which there is engaged the working or lower end portion 31 of a gear shift lever 32. The shift lever 32 is projected upwardly from selector shaft 23 through a housing chamber 33 defined by housing extension 19 outwardly of said housing 18 through a flexible conventional elastomer cap 35 the lower opening defining rim 36 of which is engaged beneath a housing lip 37 to anchor said cap 35. The manually grippable or upper end portion 34 of the gear shift lever 32 is disposed adjacent to the frame side 11 within easy reaching distance of an operator for the vehicle in association with which the instant embodiment is employed. Within the cap 35, the housing extension 19 has a pair of upwardly extending arms 38 spaced from each other transversely of the shaft 23. A medial portion of the gear shift lever 32 is disposed between arms 38 and pivoted on a pin 39 which extends through said arms 38 and retained from movement transversely of said arms by spring ring means 40.

Accordingly, as the shift lever 32 is rocked from the solid line position in FIG. 1 to the various dotted line positions illustrated, the selector shaft 23 will be slid or shifted in the track member 24 transversely of the frame 10; and as the shift lever 32 is rotated clockwise and counterclockwise with respect to FIG. 2, the selector shaft 23 together with the housing 18 will be rocked correspondingly by reason of engagement of the key ends 27 in the opposed grooves or tracks 26.

The medial portion 41 of the frame 10 has a pair of forwardly extending parallel normal extensions 42 and 43 which are spaced apart transversely of the frame 10 and through transversely aligned apertures 44 and 45 in which an end section 46 of the selector shaft 23 is projected from housing opening 21, as illustrated in FIGS. 1, 4 and 6. A gate mechanism generally designated by numeral 47 comprising a mounting boss or plate 140 the opposite ends of which are secured by fasteners 48 to a frame extension 49 is characterized by a plurality of integral depending arms or gates 50 and 51. The gates 50 and 51 are disposed in parallel spaced apart relationship to each other, and to the frame extensions 42 and 43 between which said gates 50 and 51 are disposed. The shaft extension 46 is projected through central transverse bores which extend through said gates 50 and 51. A pair of diametric transversely extending slots 52 extend away from the bore in gate 50, and a like pair of diametric slots 53 extend away from the bore in gate 51, as most clearly illustrated in FIG. 6. Said slots 52 and 53 extend transversely through their respective gates 50 and 51, and each of the slots 52 or 53 of one gate is axially or transversely aligned with a slot in the other gate.

The foregoing arrangement of components divides the space between the frame extensions 42 and 43 into a plurality of adjoining compartments 54, 55 and 56 of which, in the illustrated embodiment, the compartment 54 is defined by the frame extension 42 and the gate 50, the compartment 56 is defined by the frame extension 43 and the gate 51, and the medial compartment 55 is defined by the gates 52 and 53.

The hub 57 of a link rocker or lever 58 is freely mounted on the selector shaft portion 46 traversing compartment 54. The hub 57 has a pin-receiving outer end portion or axial extension 60 abutting the gate 50. A pair of diametrically aligned recesses or keyways 59 are provided in the outer end portion 60 radiating from the therein formed bore which accommodates the selection shaft section 46. The recesses 59 may be continuously connected to or registered with the slots 52, and they may be substantially rectangular in vertical section transversely and longitudinally of the frame 10 and have dimensions which will be explained presently.

The hub portion 61 of a like but reversed link rocker or lever 62 is freely mounted on the shaft section 46 in the compartment 56, as most clearly illustrated in FIG. 6. The hub 61 has a transverse or axial extension 64, the end face of which abuts the gate 51. There are provided a pair of diametrically opposed recesses or keyways 63 in said axial extension 64 and which radiate from the therein formed bore through which the selector shaft section 46 extends. The recesses 63 may be continuously connected to or registered with the gate openings 53 heretofore defined, and, like the keyways or recesses 59, the recesses 63 are also preferably substantially rectangular in vertical section longitudinally and transversely of the frame 10.

The hub or normally upper end portion 65 of a middle link rocker or lever 66 is freely mounted on the end selector shaft section 46 with its opposite end faces in abutment with inner or facing surfaces of the gates 50 and 51. The hub 65 has a pair of slots, grooves or recesses 67 which extend diametrically from the bore therethrough in which the shaft end portion 46 is accommodated. Said tracks, grooves or recesses 67 extend transversely through the hub 65 and may be placed in continuous continuity or registered with the gate openings 52 and 53 at a select positioning of hub 65, such as that illustrated in FIG. 6.

A dowel pin, key or the like 68 having diametric end extensions 69 which preferably extend equidistant from opposite sides of the shaft 23 is rigidly secured diametrically of said shaft in the end portion 46 thereof, as illustrated in FIGS. 6 and 7.

The lengths of the slots, recesses or keyways 52, 53, 59, 63 and 67, from the respective bores from which they extend, are at least slightly larger than the lengths of the extensions 69, respectively, from the shaft 46. Furthermore, the widths of said slots, recesses or keyways 52, 53, 59, 63 and 67, when considered in a vertical plane transversely of the longitudinal axis of the shaft 23, are substantially the same as the diameters, respectively, of the extensions 69 and preferably not substantially greater and surely not smaller for purpose of efficient operation, the nature of which will become more apparent hereinafter.

From the foregoing, it is appreciated that upon suitable positioning of the hubs 57, 61 and 65, the slots, recesses or keyways 52, 53, 59, 63 and 67 may all be brought into registration or transverse alignment, whereby the dowel pin 68 may be uninterruptedly shifted or slid with shaft 23 transversely of the frame 10 or axially of shaft 23, either wholly or partially, through a passage comprising a plurality of aligned portions or sections limited on one side by the inner face 70 defining the recesses 59 in the hub 57, and limited on the other side by the inner face 71 defining the recesses 63 in the hub 61. It is thus appreciated that by rocking the shift lever 32 clockwise and counterclockwise with respect to FIG. 1, the dowel pin 68 may be selectively positioned in each hub 57, 61 and 65 when the recesses therein are in aligned, registered or neutral positions, as illustrated in FIG. 6.

The dowel pin 68 serves as a force transmission link, whereby each of the levers 58, 62 and 66 is adapted to be rocked clockwise and counterclockwise with respect to FIG. 2, as the shift lever 32 is rocked clockwise and counterclockwise with respect to FIG. 2 out of the neutral position. When a rocked one of the levers 58, 66 and 62 is out of its neutral position, its respective dowel-carrying recesses are in dis-alignment with the openings or recesses in its adjacent gate. Accordingly, it will be impossible to remove the dowel pin from such rocked lever and therefore impossible to shift the selector shaft 23 longitudinally of its axis until the rocked hub is again returned to its neutral position and the recesses of the rocked lever re-aligned.

In lateral shifting of the selector shaft 23, a "feel" for its proper positioning in respective hubs 57 and 61 is obtained by engagement of the dowel pin 68 with a respective one of the walls 70 and 71, depending upon which lever is to be actuated. However, because the recesses 67 extend entirely through the hub 65, no abutment is provided therein to provide an operator with a "feel" of the proper positioning of the dowel pin therein. Accordingly, to advise an operator that the dowel pin 68 is in operable position within the hub 65, a resistance corresponding to such position may be supplied by grooving the shaft section 46, as at 72, for co-action with a detent comprising a ball 73 biased in said groove by the inner end of a spring 74, the outer end of which bears against an adjustable nut 75 threaded on the outer end of a stem 76 suitably mounted in the frame, as illustrated in FIGS. 1 and 6.

From the foregoing, it is appreciated that the shift pattern illustrated in FIG. 8 is available. That is to say, the line designated as 77 represents the neutral line or the path of the shift lever 32 in shifting or sliding the selector shaft 23 longitudinally thereof. Those positions which are identified by N represent the position of the shift lever when the dowel pin 68 is disposed in the respective gate recesses 52 and 53. The N positions are considered the main neutral positions inasmuch as shifting of gears is not possible while the dowel pin 68 is disposed in the recesses in the gates 50 and 51, as shaft 23 is locked from rotation about its axis. To shift the gears, it is necessary to move the shift lever head 34 to a selected one of the positions 78, 79 and 80, corresponding to disposition of the dowel pin 68 in the slots 63, 67 and 59, respectively. From the position 78, the shift lever 32 may be rocked about the longitudinal axis of the selector shaft 23 and into a selected one of the positions designated by R and 1st representing reverse and first gear. Similarly, once the dowel pin 68 is disposed in the recesses 67, the shift lever head 34 then being in position 79, the transmission may be shifted into a selected one of second and third gears represented respectively by the positions identified by 2nd and 3rd in FIG. 8. Additionally, the transmission has been shifted to the selected one of the fourth and fifth gears when the shift lever head 34 is in the position represented by a respective one of 4th and 5th in FIG. 8. At such time, the dowel pin will be engaged in the recesses 59. From the foregoing, it is appreciated that only one of the levers 58, 62 and 66 may be rocked at a time.

The gear shifting force of lever 32 is transmitted by each of the link rockers or levers 58, 66 and 62, when selected, to a respective drag link generally designated by the numeral 81. Each drag link 81 comprises an elongated rod 141 having an upper yoke or pair of arms between which an end portion 82 of its respective lever is pivotally secured in a conventional manner on a pin 83, as illustrated. At its opposite or lower threaded end portion 143, each rod 141 is adjustably threaded into the receiving end 144 of a bifurcated rod holder 84, the securance in adjusted positions to which is by means of a nut 85 threaded on a corresponding threaded end 143 against a respective receiving end 144, as illustrated clearly in FIGS. 1 and 2. As illustrated in FIGS. 1, 2 and 3, the outer end portion of the normally upper arm 86 of a bell crank 87 is pivotally secured between the bifurcation or arms 145 of each rod holder 84 by conventional means including a pivot pin 88.

As clearly illustrated in FIGS. 1, 2 and 3, a yoke supporting bracket 89 has one end portion 146 rigidly secured to the cover 101 of a vehicular transmission housing 90 by means which may include conventional fasteners 91. The opposite end portion 147 of said bracket 89 is projected horizontally outwardly from the cover 101, and supports an integral pair of spaced arms 148 projected from the outer end of bracket portion 147. A pin 92 is mounted in the outer end portions of said arms 148 and provides a customary rocking axis for said bell cranks 87, one of which is disposed between said arms 148 and the others of which are disposed on opposite sides thereof, respectively, and retained from shifting longitudinally of said pin 92 by spring rings 149 and the like, one of which is clearly seen in FIG. 2.

The bell cranks are employed to translate the vertical motion of the drag links 81 into a horizontal motion to operate a plurality of shift rails 93, each of which is operated by a respective one of the bell cranks 87, as illustrated in the drawings. To that end, the shift rails 93, which are mounted inside cover 101 and which are disposed in horizontally spaced apart relationship aligned with the depending legs 94 of the bell cranks 87, have end portions 95 projected outwardly from the housing cover 101. The rail end portions 95 are connected to the lower ends of the depending bell crank legs 94 by means of respective links 96 the inner ends of which are rigidly secured to said rails 93 by conventional fasteners 97 and the outer ends of which are pivotally secured to the arms 94, respectively, as illustrated at 98.

The inner end portions 99 of the shift rails 93 are supported for sliding movement axially thereof in a bracket or hanger 100 which extends transversely of said shift rail 93. Bracket 100 depends from and is secured to the casing cover 101 by fasteners such as screws or the like 102, as illustrated in FIGS. 2 and 3. Adjacent the positions of projection of rails 93 through the housing cover 101, said cover is thickened to provide a boss 150 disposed below bracket 89 and having a bore in which rails 93 are supported opposite bracket 100, as clearly illustrated in FIG. 2. An oil seal member 103 is provided at the outer end of bore 151 to prevent transmission oil from escaping along the rails 93, as illustrated in FIG. 2. Accordingly, by reason of the foregoing construction, each of the shift rails 93 will shift axially thereof to the right or to the left with respect to FIG. 2 upon the shifting upwardly or downwardly of its respective drag link 81; and each drag link 81 will move upwardly when its respective one of the levers 58, 66 and 62 is rocked counterclockwise with respect to FIG. 2, and it will move downwardly when its respective one of said levers is moved clockwise with respect to FIG. 2.

As illustrated in FIGS. 2 and 3, there is secured on each of the shift rails 93 by means of a screw 104 or the like the hub 105 of a yoke or fork 106. Bosses or lugs 107, carried on the lower end portions of the arms of each yoke or fork 106, engage in a groove 108 on opposite sides of the hub 109 of a respective one of shiftable transmission gears 110. The hubs 105 of yokes 106 are disposed in staggered positions along their respective rails 93 to preclude interference with the shifting of the gears 110 which are mounted on a splined shaft 111 journalled in opposite sets of bearings 112, as illustrated in FIG. 2.

Each of the shift rails 93 has a plurality of upwardly opening recesses 113, 114 and 115, spaced longitudinally of their respective rail and corresponding to the three positions of associated ones of the levers 58, 66 and 62. A detent 116 which is associated with each rail 93 comprises a compression spring 117 which is disposed in a bore 118 which extends vertically through cover 101 below the bracket 89. The upper end of each spring 117 bears against bracket 89, and the lower spring end thereof urges a ball 119 against its respective one of the rails 93. When a detent 116 is engaged in the recess 113 of its respective rail 93, its associated one of the levers 58, 66 and 62 has been rocked counterclockwise with respect to FIG. 2 a sufficient distance to cause shifting of the associated one of the gears 110. When such detent is engaged in the recess 114, such lever is now in a neutral position and adapted to permit either entry into or withdrawal from its respective hub of the dowel pin 68. When such detent 116 is engaged in the recess 115, its respective one of the levers 58, 66 and 62 has been rocked sufficiently clockwise with respect to FIG. 2 to cause shifting of its associated gear 110 to a position opposite to that position occupied when such detent was in recess 113. The detents 116 serve the purpose of refining the shifting operation by providing an operator with a "feel" that the selected gears are in suitable engagement and also prohibit overshifting of gears.

While the illustrated form of the transmission herein has been described in partial detail, it is not intended that the instant invention be limited to the gear mechanism shown, as transmissions employing various gear mechanisms are capable of adaptation to and adapted for use of the invention in the remote shifting linkage herein described.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A gear shift mechanism for operating a change-speed transmission from a remote station and comprising a frame; a passaged gate carried by said frame; an elongated shaft axially slidable and rotatably mounted in said gate; a plurality of rockable levers having outwardly extending link end portions and having hubs freely mounted on said shaft and disposed on opposite sides of said gate; lever interlocking means comprising a lug operably connected to said shaft and upon axial sliding thereof disposable in a selected one of the hubs for rocking said levers; said gate and said hubs having recesses therein to receive said lug and being alignable to permit slidable movement of said shaft between a plurality of axially displaced positions thereof; said gate and said hubs being arranged so that the lug on said shaft must pass through said passaged gate when said shaft is longitudinally moved from interlocking engagement with one rockable lever to similar engagement with another of said levers; link means connected to said link end portions and adapted for operative connection to a change-speed transmission, and lever control means connected to said shaft for operation thereof whereby upon sliding said shaft axially said lug is moved relative to said levers and upon rotation of said shaft said lug rocks a selected one of said levers to shift gears of an associated change-speed transmission.

2. A gear shift mechanism for operating a change-speed transmission from a remote station and comprising a frame having a transversely extending gear selector shaft support portion; a gate carried by said frame and having opposite sides disposed in transversely spaced relationship from said shaft support portion; an elongated shaft extending through said shaft support portion and said gate and slidable therein axially and rotatable about the longitudinal axis of the shaft; a plurality of rockable levers having hubs freely mounted on said shaft abutting opposite sides of said gate and having link end portions extending outwardly from said hubs; retainer means for holding said hubs against said gate sides, said hubs and said gates having alignable recesses outwardly from said shaft; lever interlocking means comprising a rigid lug carried by said shaft and being slidably receivable into a selected one of said recesses when adjacent ones of said recesses are aligned to thereby select a lever to be rocked, said lever interlocking means being rotatable with said shaft to rock a selected lever while concurrently disaligning the respective recess of said lever relative to the others of said recesses to thereby restrict slidable longitudinal movement of said shaft; link means for operating a transmission from a remote station and defining links connected to said link end portions, respectively, and lever control means connected to said shaft for manual operation thereof whereby upon movement of said shaft axially thereof said lug is moved relative to said levers and upon rotation of said shaft said lug interlockingly engages a recess in a hub to rock a selected lever.

3. A gear shift mechanism for operating a change-speed transmission from a remote station and comprising a frame having a shaft support portion; a manual shift lever housing having an end portion rockably mounted in said shaft support portion; a plurality of rockable gear shifting levers operably connected to the gears of a transmission for operation thereof upon rocking of said levers with each such lever having a hub portion aligned with said shaft support portion; a selector shaft slidably mounted longitudinally thereof in said shaft support portion and said hubs; interlocking means for securing said selector shaft, said shift lever housing and a selected one of said hubs from independent rotation, and a manually operated shift lever pivotally connected to said housing and to said selector shaft and rockable in a pair of normally intersecting planes whereby said selector shaft may be slid axially to an operative position in a selected lever and thereafter rotated to rock such selected lever.

4. The gear shift mechanism defined in claim 3 in which the shift lever housing is right angular, having an upper portion extending from said end portion, pivot means on the upper portion providing an axis of rotation for said manually operated shift lever, whereby upon rotation thereof about said axis of rotation the selector shaft slides longitudinally thereof and upon rocking of said shift lever longitudinally of said axis of rotation said shift lever housing and said selector shaft are rotated about the longitudinal axis of said shaft.

5. The gear shift mechanism defined in claim 3 in which the shift lever housing has an upper portion extending normally from said end portion, pivot means comprising a pair of adjacent upwardly extending arms having lower ends connected to said upper portion and spaced transversely of said selector shaft, a medial portion of said shift lever pivotally connected between said upwardly extending arms, the locking means for securing said shift lever housing against rotation relative to said selector shaft comprising an elongated keyway formed in said housing and extending longitudinally of said selector shaft and keyway engaging means on said selector shaft whereby upon application of manual torque to said shift lever longitudinally of said selector shaft said shift lever rocks about its pivotal connection independently of said arms to slide said selector shaft longitudinally thereof independently of said shift lever housing and upon application of torque transversely of said arms said shift lever rocks with said shift lever housing and selector shaft about the longitudinal axis thereof to rock a respective one of the associated gear shifting levers.

6. A gear shift mechanism for operating a change-speed gear transmission from a remote station and comprising a transversely extending frame having a shaft support portion, said shaft support portion having an elongated transversely extending passage and at opposite ends thereof a pair of opposed end openings; a pair of parallel spaced apart frame extensions having apertures aligned with said passage; gate means comprising a plurality of parallel spaced apart gates mounted between said frame extensions and spaced therefrom, said gates having therethrough extending gate openings alignable with said passage and said apertures; a selector shaft slidable longitudinally thereof disposed in said passage and projecting from one of said end openings through said apertures and gate openings; a plurality of rockable levers having a hub on each that is mounted freely on said selector shaft between said gates and said frame extensions and having an outer link connecting end portions on each of said levers, said hubs and gates having alignable slots radially extending from said shaft; interlocking means comprising a lug rigidly secured to said shaft and slidable longitudinally into and out of said slots when aligned and selectively locatable in each of said slots upon rotation of said selector shaft about the longitudinal axis thereof; link means for operating the change-speed gears of a transmission and comprising links connected to said link connecting end portions, and manual shift lever control means for operating said selector shaft to slide longitudinally thereof and to rotate said shaft about its longitudinal axis to thereby select one of said rockable levers and rock same to effect the shifting of an associated transmission change-speed gear.

7. A gear shift mechanism for operating a change-speed gear transmission from a remote station and comprising a transversely extending frame; a pair of parallel spaced apart frame extensions having transversely aligned apertures; gate means comprising a plurality of spaced apart gates rigidly mounted between and spaced transversely from said frame extensions, said gates having therethrough extending openings aligned with said apertures, said extensions and said gates providing therebetween a plurality of chambers; an elongated selector shaft mounted in said apertures and openings and slidable therein longitudinally of its longitudinal axis; lever means comprising a medial lever and a plurality of outer levers disposed transversely of said frame, said levers having hubs disposed in said chambers, respectively, and freely mounted about said selector shaft in substantial abutment with said gates, said hubs having recesses extending radially from said selector shaft, said gates having therethrough extending slots radial to said selector shaft, said slots and recesses being alignable; means for selectively rocking said levers singly comprising a lug rigidly connected to said shaft and slidable into and out of said recesses and slots when aligned longitudinally of said selector shaft, said lug when rocked about the longitudinal axis of said selector shaft being operative to interlock with and rock a selected one of said levers to disalign its recess relative to the others of said slots and recesses and thereby constrain said lug and selector shaft against movement longitudinally thereof; link means operable by said levers to shift the change-speed gears of a transmission, and manual control means rockable in normal planes for applying torques to said selector shaft longitudinally and rocking about the longitudinal axis thereof.

8. The gear shift mechanism defined in claim 7 further characterized by selector shaft position sensing means comprising stops in the hubs of said outer levers disposed at the ends of said recesses in the path of longitudinal movement of said lug whereby the lug is abuttingly engaged when fully disposed in the recesses of said outer levers.

9. The gear shift mechanism defined in claim 8 further characterized by detent means cooperative between said frame and said selector shaft for sensing the position of the selector shaft when said lug is disposed in the hub of said medial lever.

10. A gear shift mechanism for operating a vehicular change-speed gear transmission from a remote station and comprising a vehicle frame defining the sides of a vehicle and a shaft support portion extending transversely of said sides, said shaft support portion having a therethrough extending passage and providing inner and outer end openings; a right angular shift lever housing having a lower transverse extension extending through said outer end opening and projected into and rotatable in said shaft support portion, said shift lever housing having an upper end portion disposed outwardly of one of the vehicle sides and providing a pivot extending longitudinally of said sides; a manual shift lever having a medial portion rockably mounted on said pivot in a vertical plane extending transversely of said sides and having a lower work end portion; a selector shaft disposed in said elongated passage and keyed to said housing for sliding transversely of said sides independently of said shift lever housing and rotation therewith about the longitudinal axis of said selector shaft, said selector shaft connected to said lower work end portion for longitudinal movement therewith and having an outer end portion projecting from said inner end opening; a plurality of gear operating levers mounted freely on said outer end portion longitudinally of said shaft; means interlocking said outer end portion with singly selected ones of said gear operating levers for rotation thereof with said shaft, and link means connecting said gear operating levers to associated gears of a change-speed transmission whereby upon sliding said selector shaft longitudinally thereof said gear operating levers are not actuated but upon rotating selector shaft about its longitudinal axis a selected one of said gear operating levers will rock correspondingly to shift an associated gear.

References Cited by the Examiner

UNITED STATES PATENTS

| | | | |
|---|---|---|---|
| 2,922,315 | 1/1960 | Primeau | 74—473 |
| 2,951,393 | 9/1960 | Schroeder et al. | 74—473 |
| 3,082,638 | 3/1963 | Nilson | 74—473 |
| 3,164,030 | 1/1965 | Fodrea et al. | 74—475 X |

MILTON KAUFMAN, *Primary Examiner.*